No. 648,644. Patented May 1, 1900.
W. S. THOMAS.
LOOM.
(Application filed May 18, 1899.)
(No Model.) 10 Sheets—Sheet 2.

WITNESSES: INVENTOR:

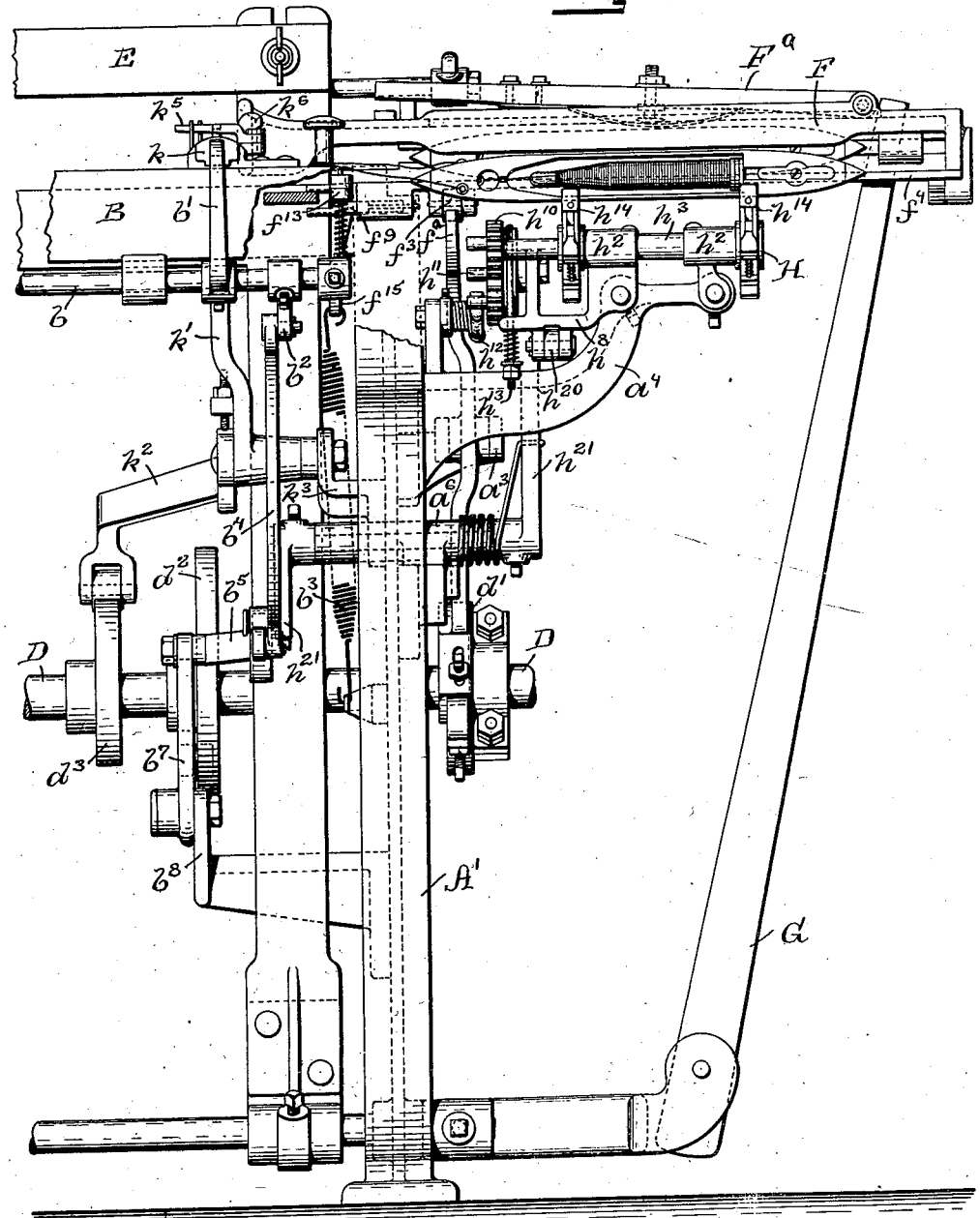

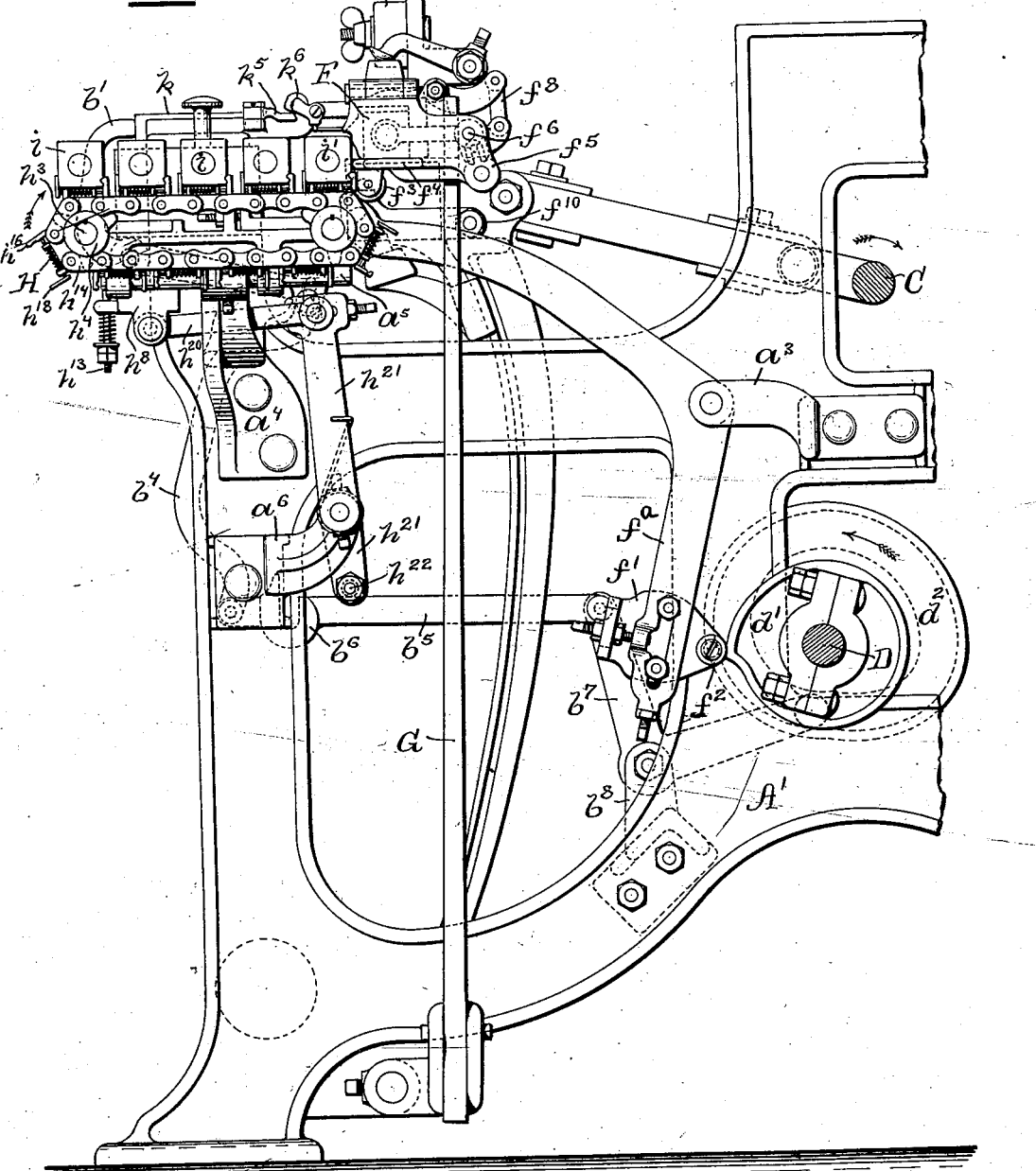

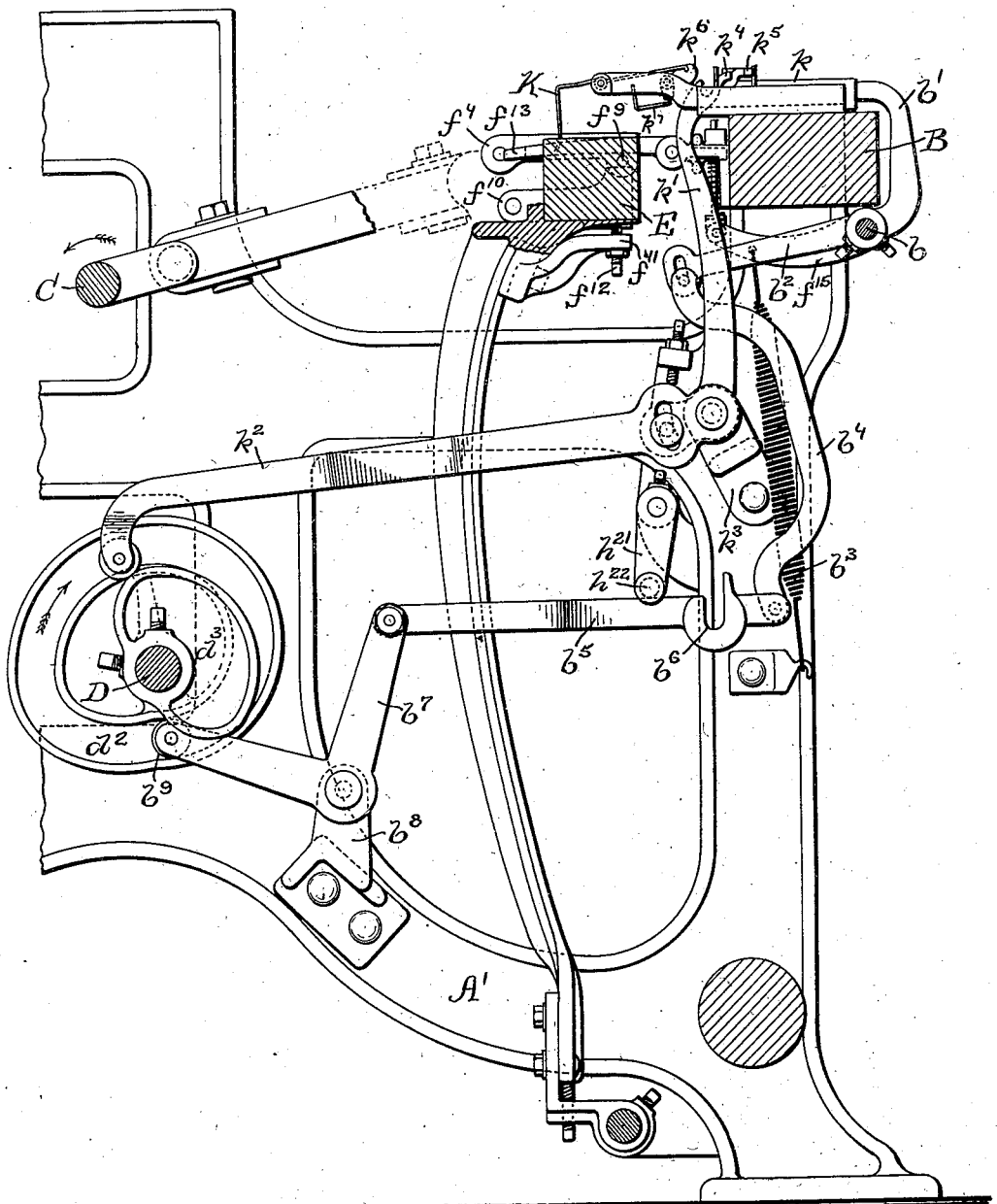

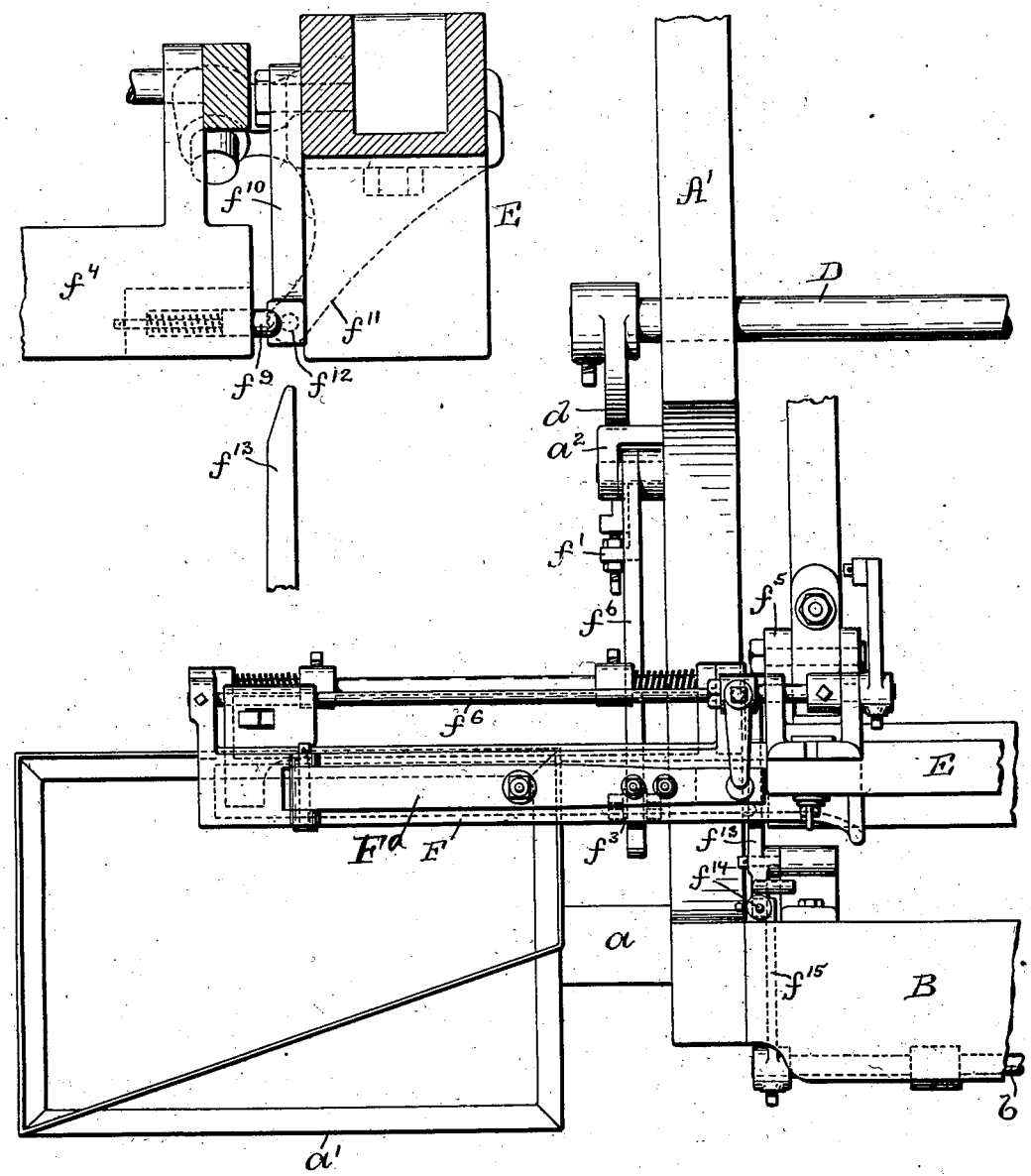

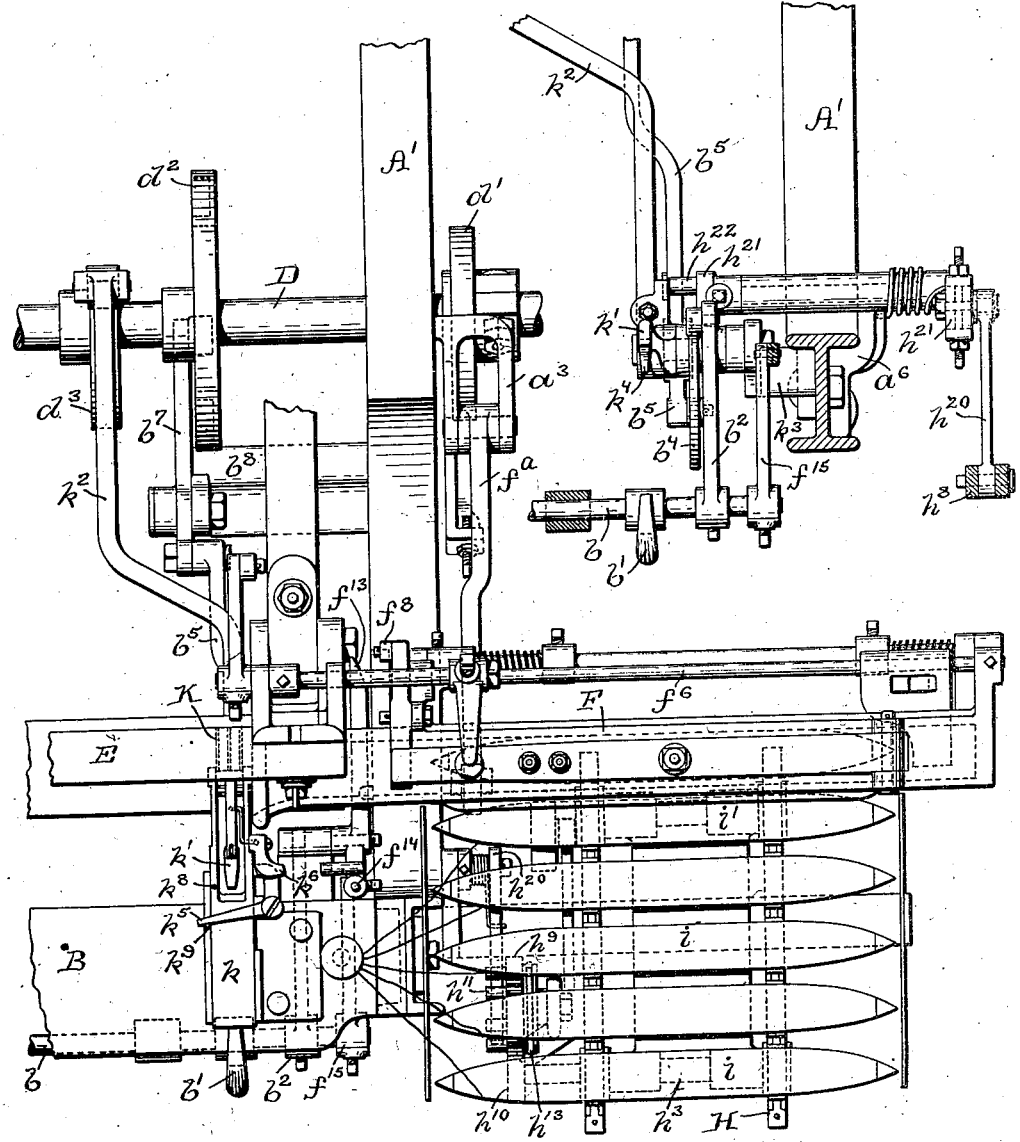

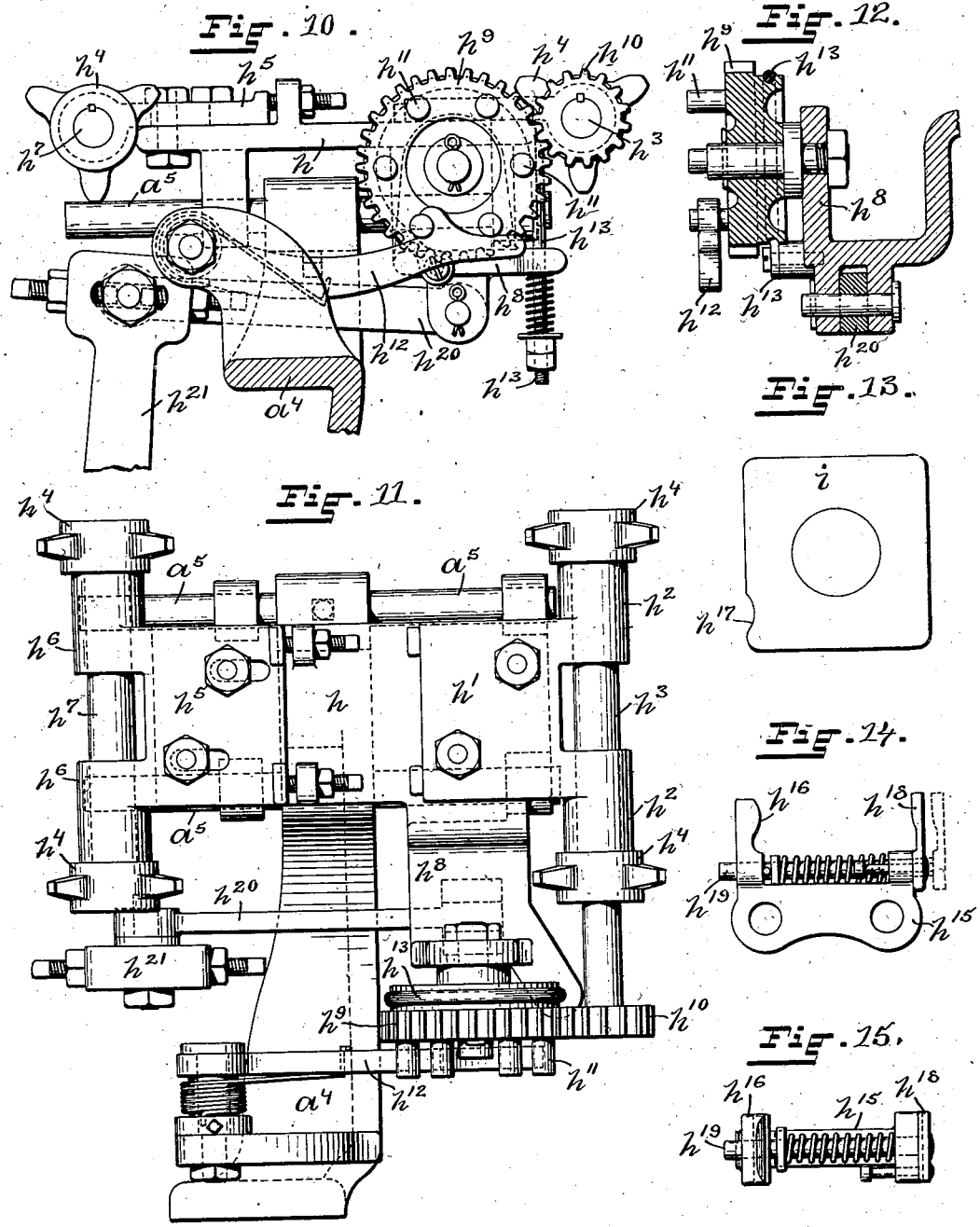

No. 648,644. Patented May 1, 1900.
W. S. THOMAS.
LOOM.
(Application filed May 18, 1899.)
(No Model.) 10 Sheets—Sheet 9.
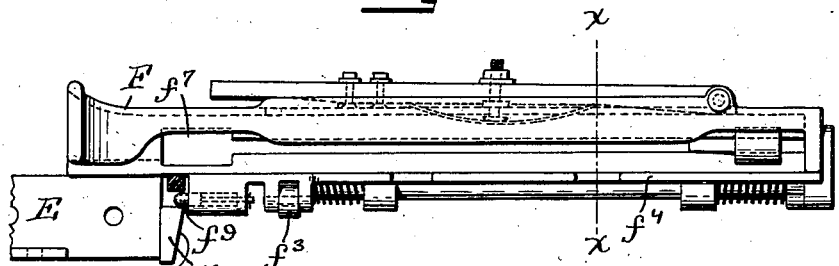
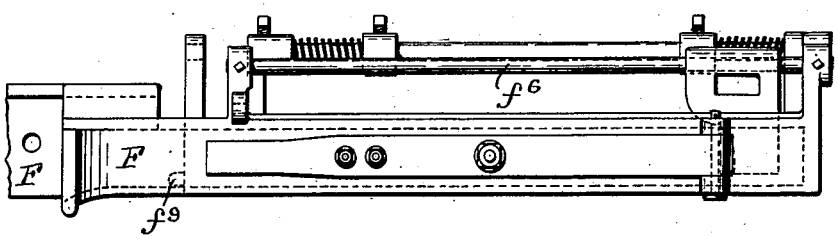
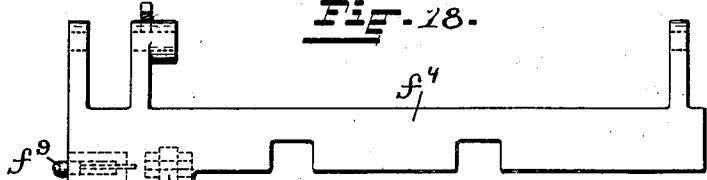
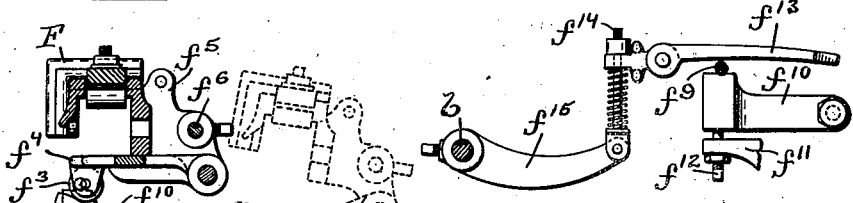
WITNESSES: Chas. H. Luther Jr. B. M. Simms
INVENTOR: Winfield S. Thomas by Joseph A. Miller & Co. Attys.

No. 648,644. Patented May 1, 1900.
W. S. THOMAS.
LOOM.
(Application filed May 18, 1899.)
(No Model.) 10 Sheets—Sheet 10.

WITNESSES:
Chas. H. Luther Jr.
B. M. Simms

INVENTOR:
Winfield S. Thomas
by Joseph A. Miller & Co.
Attys.

UNITED STATES PATENT OFFICE.

WINFIELD S. THOMAS, OF BOSTON, MASSACHUSETTS, ASSIGNOR OF ONE-HALF TO THE WHITIN MACHINE WORKS, OF WHITINSVILLE, MASSACHUSETTS.

LOOM.

SPECIFICATION forming part of Letters Patent No. 648,644, dated May 1, 1900.

Application filed May 18, 1899. Serial No. 717,299. (No model.)

*To all whom it may concern:*

Be it known that I, WINFIELD S. THOMAS, of Boston, in the county of Suffolk and State of Massachusetts, have invented a new and useful Improvement in Looms; and I hereby declare that the following is a full, clear, and exact description of the same, reference being had to the accompanying drawings, forming part of this specification.

This invention has reference to an improved shuttle-supplying mechanism for looms.

The object of the invention is the maintenance of the supply of weft or filling in a loom by discharging the shuttle the filling of which has been broken or exhausted and inserting a shuttle provided with filling automatically into the shuttle-box without stopping the loom. On one side of the loom a shuttle-carrier supporting a series of reserve shuttles serves to carry a shuttle into the shuttle-box on the failure of the filling, and a gate on the other side of the loom is opened to discharge the shuttle which has failed to lay the filling into a receiver. The mechanism through which the faulty shuttle is ejected and a fresh shuttle supplied is controlled by the weft-fork, so that the fresh shuttle is inserted into the shuttle-box on one side of the loom, while the faulty shuttle is ejected from the shuttle-box on the opposite side of the loom.

The invention consists in the peculiar and novel construction and the combination of the parts, which will be more fully described hereinafter.

Figure 1:
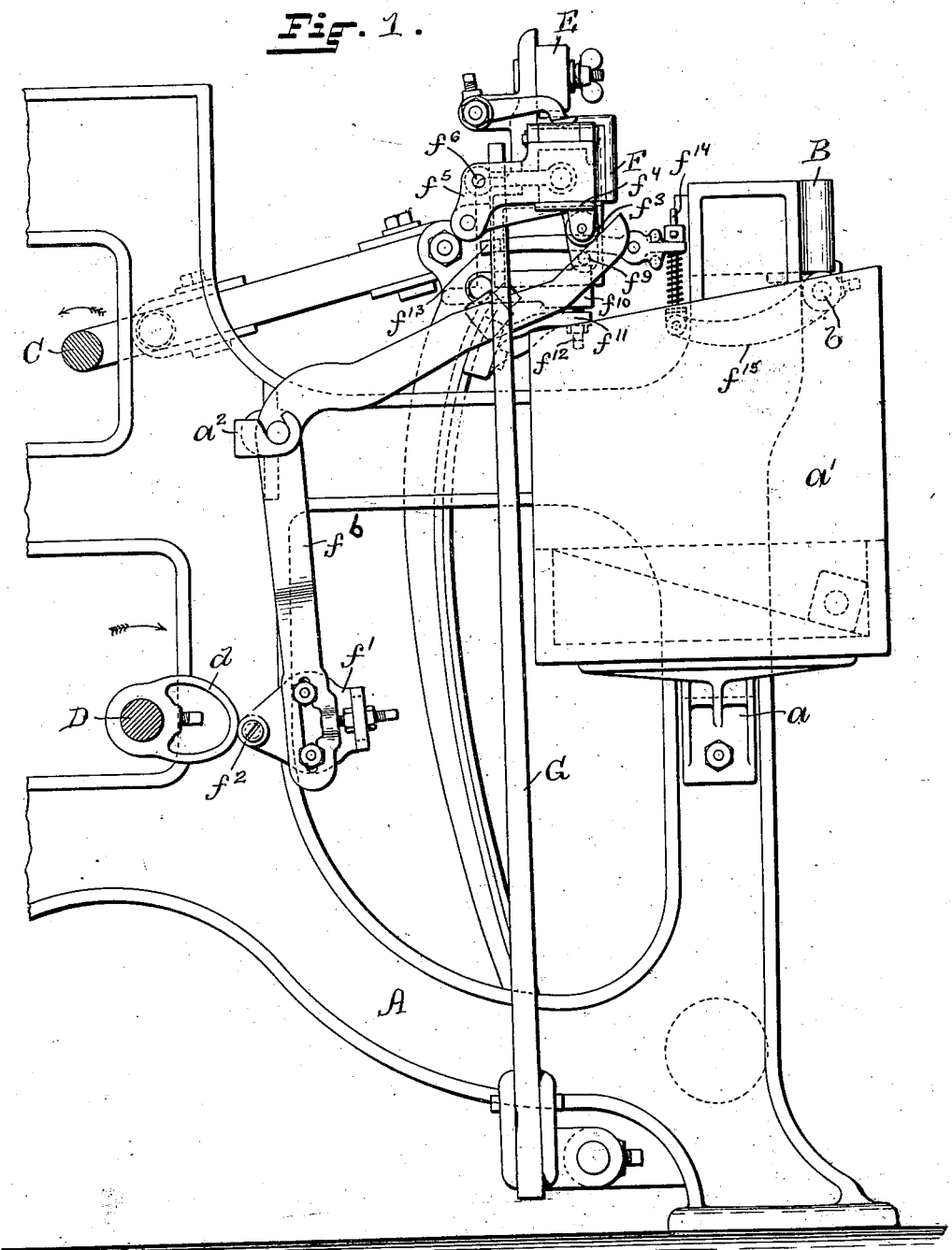
Figure 2:
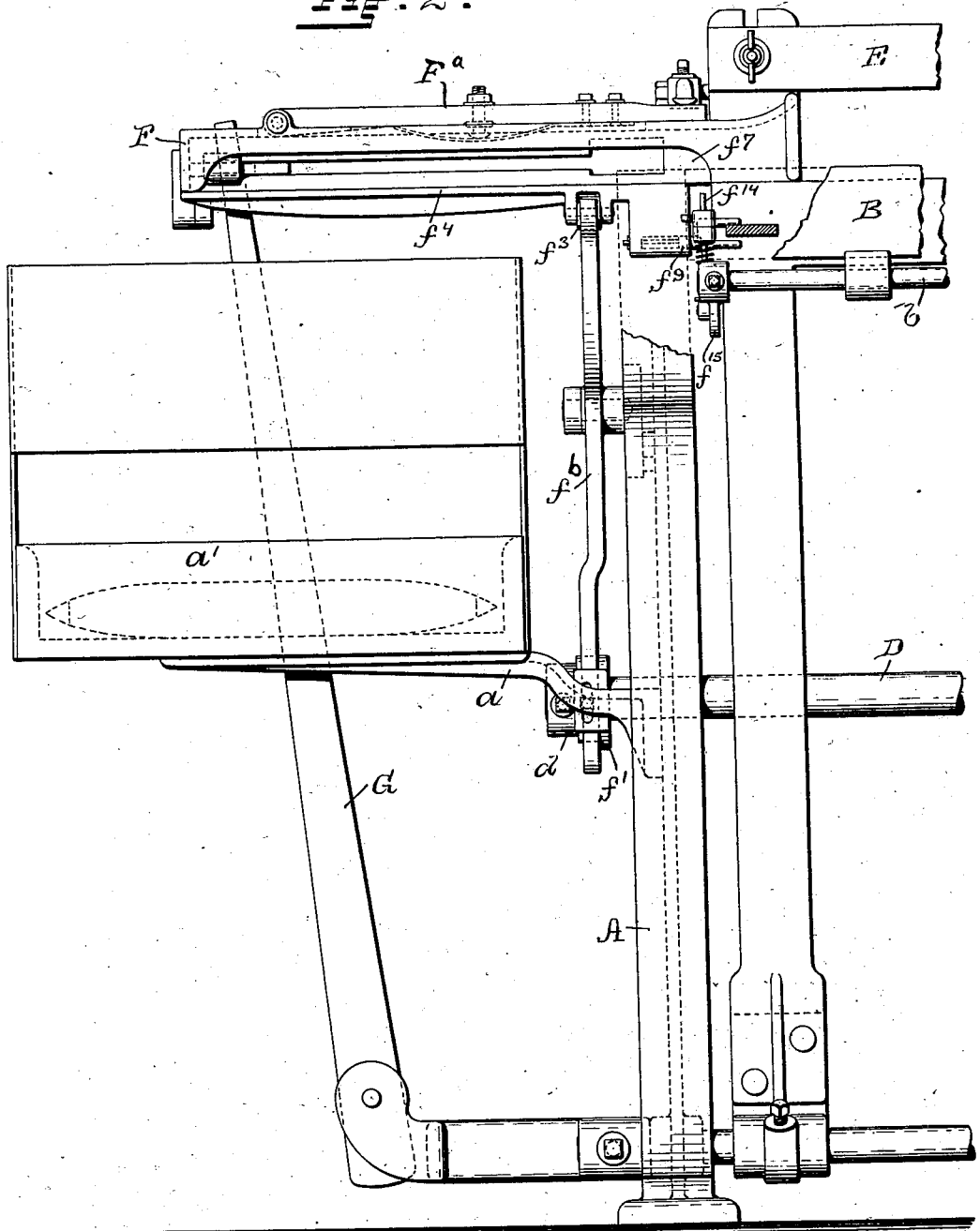
Figure 22:
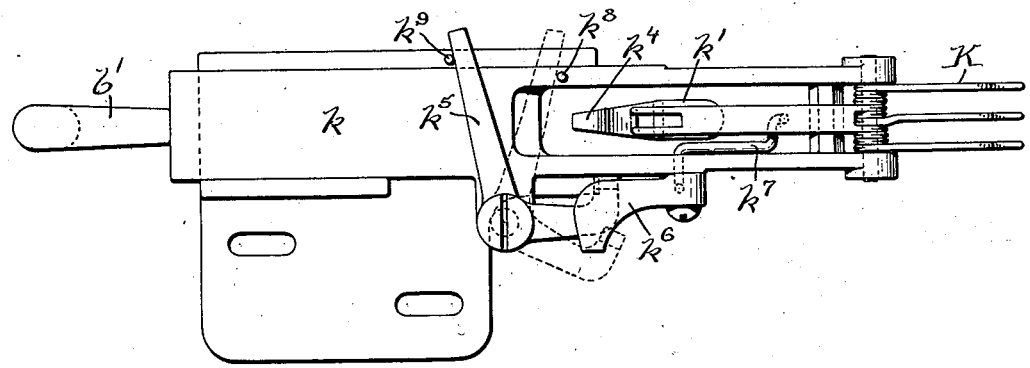
Figure 23:
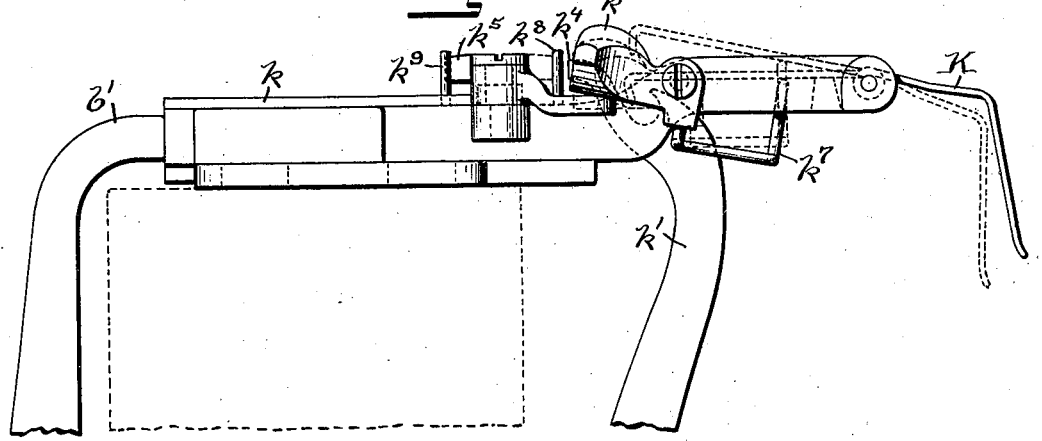
Figure 24:
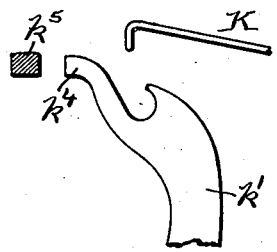
Figure 25:
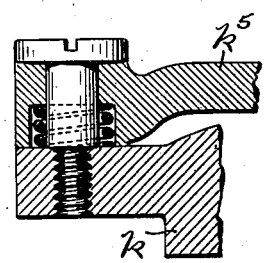
Figure 26:
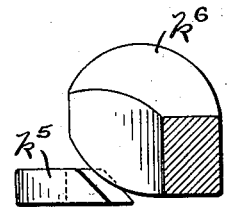

Figure 1 is a view of part of the side of the loom where the faulty shuttle is discharged, showing the mechanism operating the discharging-gate and the receptacle for the discharged shuttles. Fig. 2 is a front view of the shuttle-discharging side of the loom. Fig. 3 is a front view of the shuttle-supplying side of the loom, showing the mechanism for operating the shuttle-carrier. Fig. 4 is a side view of part of the loom, showing the shuttle-supplying mechanism. Fig. 5 is a transverse sectional view of part of the loom, showing the lever connections and cams for operating the shuttle-supply in connection with the weft-fork. Fig. 6 is a plan view of the shuttle-discharging side of the loom. Fig. 7 is a plan view, partly in section, of the device for locking the shuttle-discharging gate. Fig. 8 is a top view of the shuttle-supplying end of the loom. Fig. 9 is a top view showing the connections of the cam-levers with the weft-fork slide and with the shuttle-carrier. Fig. 10 is an end view of the support of the shuttle-carrier. Fig. 11 is a top view of the same. Fig. 12 is a cross-sectional view of part of the shuttle-carrier support. Fig. 13 is an end view of one of the shuttles, showing a concave groove on one side of the central portion of the shuttle. Fig. 14 is a side view of one of the spring-clamps supporting the shuttle on the shuttle-carrier. Fig. 15 is a top view of the same. Fig. 16 is a front view of the shuttle-box at the shuttle-receiving end of the lay. Fig. 17 is a top view of the same. Fig. 18 is a plan view of the gate. Fig. 19 is a sectional view of the shuttle-box on the line X X of Fig. 16, showing the same in the closed position in solid lines and in the open position in broken lines. Fig. 20 is a detail of the gate-locking device. Fig. 21 is a plan view, partly in section, of the gate-locking device. Fig. 22 is a top view of the weft-fork, showing the mechanism for holding the weft-fork until a fresh shuttle is inserted. Fig. 23 is a side view of the same. Figs. 24, 25, and 26 are details of the mechanism connected with the weft-fork.

In my improved shuttle-changing loom a number of shuttles are placed opposite the shuttle-receiving shuttle-box on the shuttle-carrier on the right-hand side of the loom, as illustrated in the drawings. The shuttle-box on the right-hand side of the loom is open in front along the lower part and has an opening in the bottom closed by a gate. The shuttle-discharging shuttle-box on the left-hand side of the loom also has an opening in the front and a gate closing the bottom.

In the normal operation of the loom the gates of the shuttle-boxes are closed and locked in the closed position. When the filling in the shuttle on the lay runs out or breaks and the weft-fork fails to encounter the weft-thread, the weft-slide actuates the rock-shaft on the breast-beam, which controls the shuttle-changing mechanism as the lay completes its forward movement. The shuttle-changing mechanism during the backward-and-forward movement of the lay operates to connect the shuttle-carrier, and the shuttle is thrown from the shuttle-box at the receiving end of the lag to the shuttle-box at the shuttle-discharging end of the lay at the left side of the loom. As the lay approaches the end of its forward movement the gates are unlocked and open—one to discharge the faulty shuttle and the other to receive the fresh shuttle.

The arrangement of the operative cams and levers are preferably such that a complete rotation of the cam-shaft and two rotations of the crank-shaft are required to complete the operation of discharging a faulty shuttle and replacing the same by a fresh shuttle. In high-speed looms I find this construction more reliable and more durable. During the next backward-and-forward movement of the lay the shuttle-carrier is moved backward to carry the foremost reserve shuttle into the shuttle-box as it approaches the end of its outward movement, the gates are raised and locked, and the loom after losing two picks continues to weave cloth without having been stopped during the change of shuttles.

Similar marks of reference indicate corresponding parts in all the figures.

In the drawings, A and A' indicate part of the side frames of the loom; B, the breast-beam; C, the crank-shaft; D, the cam-shaft; E, the lay; F F, the shuttle-boxes; G G, the picker-sticks; H, the carrier for the reserve shuttles.

All the parts of the loom are shown in the different figures of the drawings in solid lines in the positions they occupy when the lay is at the extreme forward end of oscillation.

Referring to Figs. 1 and 2, $a$ indicates a bracket secured to the side frame A at the shuttle-discharging side of the loom; $a'$, a shuttle-receptacle supported on the bracket $a$ for the reception of the shuttles ejected from the shuttle-box F. The bracket $a^2$, secured to the side frame A, forms the pivotal support for the lever $f^b$, the lower end of which has the bracket $f'$, supporting the roller $f^2$, adjustably secured to it. The roller $f^2$ bears on the cam $d$ on the cam-shaft D. The upper part of the lever $f^b$ acts on the roller $f^3$, pivotally supported in brackets extending from the forward edge of the gate $f^4$, hinged on the brackets $f^5 f^5$, which are secured to and project rearward from the shuttle-box, as shown in Figs. 17 and 19. The shuttle-boxes F F at the opposite sides of the loom are each provided with a gate $f^4$, which forms the bottom of the shuttle-box. The gates are pivoted on the rod $f^6$, supported by the brackets $f^5 f^5$. The fronts of the shuttle-boxes have the openings $f^7 f^7$.

When a shuttle is inserted into the shuttle-box, the front of the gate is swung down and passes under the shuttle presented by the shuttle-carrier. The shuttle passes into the shuttle-box through the opening $f^7$, and as the gate is closed the shuttle is raised behind the closed part of the front of the shuttle-box. When a shuttle is to be ejected from the discharging shuttle-box, the opening of the gate allows the shuttle to drop and pass out of the shuttle-box into the receptacle, said shuttle being guided by the gate.

The swells $F^a$ are located in the upper sides of the shuttle-boxes and controlled by the lever mechanism $f^8$, connected with and operated by the gate $f^4$, as is shown and described in United States Patent No. 617,311 for improvements in looms, granted to me January 3, 1899. The gates $f^4$ are each provided at their inner ends, as shown in Fig. 16, with a lock-bolt $f^9$, sliding in a cavity and held in the locked position by a coiled spring, as shown in Fig. 21. The bracket $f^{10}$ consists of an arm pivotally secured to the lay and has a beveled latching-face $f^x$, by which the lock-bolt $f^9$ is slid inward as the gate is closing, the said lock-bolt springing out when the end of the bolt has passed the inclined face of the bracket $f^{10}$ to rest on the bracket and support the gate in the closed position, as shown in Figs. 7 and 16. The bracket $f^{IV}$ may be adjusted by the screw $f^{12}$ in screw-thread engagement with the arm $f^{11}$, secured to a convenient part of the lay, said screw bearing on the under side of the bracket $f^{10}$ and held in the adjusted position by a lock-nut. The gate is unlocked by means of the dagger $f^{13}$, the beveled pointed end of which when placed into the proper position, passing between the end of the lock-bolt $f^9$ and the lay E, pushes back the bolt and releases the gate as the lay swings toward the breast-beam, as shown in Figs. 20 and 21.

The dagger $f^{13}$ is pivotally supported on a bracket secured to the inner side of the breast-beam. The forward end of the dagger is beveled on the side toward the gate. The rear end of the dagger $f^{13}$ is perforated. The rod $f^{14}$ extends through the perforated rear end of the dagger. A coiled spring surrounding the rod $f^{14}$ holds the rear end of the dagger against a collar adjustably secured to the rod $f^{14}$. The rod $f^{14}$ is pivotally secured to the end of the arm $f^{15}$, which arm extends under the breast-beam and is secured to the rock-shaft $b$. When the rock-shaft $b$ is operated by the weft-fork slide, the arm $f^{15}$ raises the rod $f^{14}$ and rocks the dagger $f^{13}$ on its pivotal support, thereby depressing the beveled end of the dagger. The next forward swing of the lay brings the end of the lock-bolt $f^9$ in contact with the beveled end of the dagger, pushing the lock-bolt into the recess in the gate $f^4$ to unlock the gate and allowing the gate to swing open.

On the right-hand side of the loom the shuttle-supplying mechanism is located. On the side frame A' the bracket $a^3$ forms the pivotal support of the lever $f^a$, having the bracket $f'$ near its lower end, supporting the roller $f^2$. This lever $f^a$ acts on the roller $f^3$ on the gate $f^4$, closing the bottom of the shuttle-supplying shuttle-box, and the roller $f^2$ bears on the cam $d'$, performing exactly the same functions as the lever $f^b$ on the shuttle-discharging side of the loom. The sole difference in their actions is that the gate at the shuttle-discharging side of the loom opens wider than the gate at the shuttle-supplying side, where the gate only drops sufficiently to pass under the advanced shuttle, so as to lift the shuttle off the shuttle-carrier into the shuttle-box.

The bracket $a^4$, secured to the side frame A', forms the support for the carrier H, on which the reserve shuttles are supported. On the bracket $a^4$ the rods $a^5$ $a^5$ are secured, so as to extend horizontally from each side of the bracket. The bed $h$ is supported and slides on the rods $a^5$ $a^5$. On the bed $h$ the bracket $h'$, provided with the journal-bearings $h^2$ $h^2$, is rigidly secured. The driving-shaft $h^3$, on which the sprocket-wheels $h^4$ $h^4$ are secured, is journaled in the bearings $h^2$ $h^2$. The bracket $h^5$, having the journal-bearings $h^6$ $h^6$, is adjustably secured to the bed $h$ and supports the driven shaft $h^7$, on which the sprocket-wheels $h^4$ $h^4$ are secured. The bracket $h^8$ extends from the bed $h$ and forms the support for the gear $h^9$, engaging with the pinion $h^{10}$ on the driving-shaft $h^3$. The gear $h^9$ has projecting from its side the studs $h^{11}$ $h^{11}$. The pawl $h^{12}$, pivotally supported on the bracket $a^4$, is held in contact with the studs $h^{11}$ $h^{11}$ on the gear $h^9$ by a spring. When the bed $h$ and the parts connected to it are moved on the rods $a^5$ $a^5$, the pawl $h^{12}$ turns the gear $h^9$ and through it the driving-shaft $h^3$.

To insure the accurate step-by-step rotation of the gear $h^9$ and to hold the gear $h^9$ and the parts connected with and operated through the said gear, I place the brake-strap $h^{13}$, secured at one end to the bracket $h^8$ and held on the other end by a coiled spring, on the gear $h^9$.

Two endless chains $h^{14}$ $h^{14}$ are placed on and are operated by the sprocket-wheels $h^4$ $h^4$. At predetermined intervals the spring-clamps $h^{15}$ (shown in Figs. 14 and 15) are secured to a link on each of the chains $h^{14}$ $h^{14}$. These spring-clamps consist of a plate adapted to be secured to one of the chain-links provided at one end with the fixed arm $h^{16}$, having a concavo-convex inner surface corresponding with the concavo-convex lower edge $h^{17}$ of the shuttle $i$. On the opposite side the arm $h^{18}$, secured to the spring-pressed rod $h^{19}$, yields to the shuttle $i$ when it is inserted and reacts to hold the shuttle firmly against the arm $h^{16}$. The convex portion of its surface entering the concave surface at the lower part of the shuttle firmly holds the shuttle and yet permits the raising of the shuttle out of the spring-clamps $h^{15}$ by the gate $f^4$ of the shuttle-box.

The shuttle-carrier H may be arranged to support any desired number of shuttles $i$ $i$. In practice I find five sufficient. The advance shuttle $i'$ is moved into the shuttle-box over the then-lowered gate $f^4$ by sliding the shuttle-carrier inward toward the lay as the lay swings forward, so that when the lay reaches the forward end of its oscillation the shuttle $i'$ will be lifted off from the shuttle-carrier and raised into the shuttle-box by the closing of the gate $f^4$. To give to the carrier this inwardly-sliding motion, the arm $h^{20}$ is at one end pivotally secured to the bracket $h^8$, forming part of the bed $h$. The other end of the arm $h^{20}$ is pivoted to a stud adjustably secured in the slotted end of the lever $h^{21}$, which is pivoted near its lower end in the bracket $a^6$, secured to the side frame A'. At the lower end of the lever $h^{21}$ is the stud $h^{22}$. By moving the lower end of the lever $h^{21}$ toward the front of the loom the upper end of the lever through the arm $h^{20}$ slides the carrier H and the shuttles on the same inward, and by moving the lever $h^{21}$ in the opposite direction it slides the carrier outward. During this outward motion the pawl $h^{12}$ rotates the gear $h^9$ and the pinion $h^{10}$, moving the endless chains $h^{14}$ and advancing the shuttles $i$ $i$, so that one of the shuttles is placed in the advanced position of the shuttle $i'$.

When the weft-work K fails to encounter a weft-thread, it connects with the weft-hammer, which moves the weft-slide $k$ against the arm $b'$, secured to the rock-shaft $b$, journaled in bearings secured to the breast-beam B, and rocks the rock-shaft. (See Fig. 5.) The arm $b^2$, also secured to the rock-shaft $b$, is raised against the tension of the coiled spring $b^3$, one end of which is secured to the side frame or a fixed part of the loom and the other end to the arm $b^2$. The outer end of the arm $b^2$ is connected, by means of the bar $b^4$, with the end of the arm $b^5$ provided with the seat $b^6$, adapted to engage with the stud $h^{22}$ on the lever $h^{21}$. The other end of the arm $b^5$ is pivotally connected with the bell-crank lever $b^7$, journaled in the bracket $b^8$. The other end of the bell-crank lever $b^7$ is provided with a roller $b^9$, engaging with the grooved cam $d^2$, secured to the cam-shaft D, so that when the arm $b^5$ is in engagement with the stud $h^{22}$ the cam $d^2$ operates the shuttle-carrier, as above described. The weft-hammer $k'$ forms, with the arm $k^2$, a bell-crank lever pivotally supported on the bracket $k^3$. The end of the arm $k^2$ is provided with a roller which bears on the cam $d^3$, secured to the cam-shaft D. The upper part of the weft-hammer is provided with the horn $k^4$. Pivotally secured to the weft-fork slide $k$ is the bell-crank lever $k^5$, one of the arms of which extends across the top of the slide and the other arm extends under the arm $k^6$, pivotally secured to the side of the slide $k$. The wire $k^7$ extends from the arm $k^6$ to a point under the weft-fork K. As is shown in Figs. 22 and 23 and in detail in Figs. 24, 25, and 26, the stop-pin $k^8$ on the slide $k$ and the stop-pin $k^9$ on the frame supporting the slide limit the movement of the bell-crank lever. The object of this arrangement is to support the tail of the weft-fork above the path of the weft-hammer, so that when the filling fails and the tail of the weft-fork engages with the weft-hammer to move the slide $k$ forward one arm of the bell-crank lever $k^5$ encounters the stop-pin $k^9$, which swings the bell-crank lever into the position shown in broken lines in Fig. 22. The weighted end of the arm $k^6$, the lower surface of which is curved, as is shown in Figs. 23 and 26, so that as the arm of the bell-crank lever on which the weighted arm is supported moves outward the weighted end of the arm $k^6$ descends, and thereby raises the end of the wire $k^7$ and by it the tail end of the weft-fork above the path of the weft-hammer, which at the next forward movement passes under the hook on the tail end of the weft-fork without engaging with the same; but the horn $k^4$ of the weft-hammer strikes the arm of the bell-crank lever $k^5$ extending across the slide $k$ and moves the same from the position shown in broken lines to the position shown in solid lines in Fig. 22, thereby raising the weighted end of the arm $k^6$ and lowering the end of the wire $k^7$, so that after the second swing of the weft-hammer the weft-fork is again in the operative condition to cause the weft-hammer to engage with the weft-fork if the weft has failed to be laid.

I will now describe the sequence of the operations performed on the detection of a broken weft-thread, and in this description I will refer to the lever controlling the operation of the gate for the admission of the fresh shuttle as the lever $f^a$ and the lever controlling the gate at the opposite end of the lay for the discharge of the shuttle as the lever $f^b$. When owing to the absence of a weft-thread the weft-fork is not tilted, the hook on the rear end of the weft-fork engages with the weft-hammer, the weft-fork and weft-fork slide are pushed against the arm on the rock-shaft $b$, causing the same to rock, and the weft-fork is held in the tilted position until the weft-fork slide is returned to its normal position through the operation of the bell-crank lever $k^5$, as before described. The rocking of the rock-shaft controls the operations of the daggers $f^{13}$ to unlock the gates forming the bottoms of the shuttle-boxes on the opposite ends of the lay and allows the gates to open, subject to the movement of the levers $f^a$ and $f^b$. These levers are operated by cams on the cam-shaft of the loom. The cam controlling the lever $f^a$ imparts a limited movement to the lever, which permits the gate of the shuttle-box to open sufficiently to pass under the shuttle to be supplied and then lift the shuttle off from the carrier and into the shuttle-box. The cam controlling the lever $f^b$ imparts a greater range of movement to the lever and so permits a wider opening of the gate forming the bottom of the shuttle-box for the discharge of the shuttle. As the cam-shaft makes one revolution to every two revolutions of the crank-shaft, the levers $f^a$ and $f^b$ only operate to close the gates of the shuttle-boxes, if open, every other pick. The gate controlled by the lever $f^b$ directs the faulty shuttle into the receptacle, while the gate controlled by the lever $f^a$ is lowered to receive the most advanced fresh shuttle on the shuttle-carrier. The shuttle-carrier is operated by the grooved cam $d^2$ on the cam-shaft through the mechanism heretofore described connected by the rocking of the rock-shaft.

Having thus described my invention, I claim as new and desire to secure by Letters Patent—

1. In a loom, a lay, two shuttle-boxes one on each end of the lay, openings in the fronts of the shuttle-boxes, a gate for each of the two shuttle-boxes, said gates being pivotally supported on the rear and forming the bottoms of the shuttle-boxes, means for opening the gates, means for controlling one gate to guide the discharge of the shuttle and close the gate, and means for controlling the other gate to raise the fresh shuttle into the shuttle-box; whereby a defective shuttle may be ejected from the shuttle-box at one end of the lay while a fresh shuttle is automatically inserted into the shuttle-box on the other end of the lay, as described.

2. In a loom, the combination of the following instrumentalities: a lay, a shuttle-box on one end of the lay open in front for the insertion of the shuttle, a shuttle-box on the other end of the lay open in front for the discharge of the shuttle, gates normally forming the bottoms of the shuttle-boxes, mechanism operated from the cam-shaft controlling one gate to discharge the faulty shuttle and the other gate to supply the fresh shuttle, locking devices for the gates, a shuttle-carrier, and mechanism controlled by the weft-fork for unlocking the gates and actuating the shuttle-carrier; whereby when the weft breaks, or is exhausted, the gates and the shuttle-carrier are operated to carry a fresh shuttle into the receiving shuttle-box at one end of the lay and to eject the faulty shuttle from the discharging shuttle-box on the other end of the lay without stopping the loom, as described.

3. In a loom, a lay, a shuttle-receiving shuttle-box and a shuttle-discharging shuttle-box on the opposite ends of the lay, openings in the fronts of the shuttle-boxes, a gate for each shuttle-box hinged at the rear of the shuttle-boxes, mechanism operated by the cam-shaft for controlling the gates in discharging the faulty shuttle from one shuttle-box and the insertion of the fresh shuttle into the other shuttle-box, a carrier supporting reserve shuttles, a receptacle for the ejected shuttles, and mechanism controlled by the weft-fork for opening the gates and actuating the carrier, whereby, when the weft breaks, or is exhausted, the gate of the receiving shuttle-box is swung open to permit the insertion of a fresh shuttle into the shuttle-box and the gate in the discharging shuttle-box swings open to eject the faulty shuttle into the receptacle, as described.

4. In a loom, the combination with the lay, a shuttle-box on the lay, a hinged gate normally forming the bottom of the shuttle-box, a shuttle-carrier forming the support for the reserve shuttles located in front of and below the shuttle-box, a bed supported on ways, forming the sliding support of the shuttle-carrier, means for sliding the carrier and means for operating the gate, whereby, when the gate is opened, a shuttle may be carried over the gate and lifted into the shuttle-box by the closing of the gate, as described.

5. In a loom, the combination with one of the side frames of the loom, of a bracket extending from the side frame, supports on the bracket, a bed carried on the supports and having capacity to slide on the supports, shafts provided with sprocket-wheels supported in journals carried by the bed, two endless chains connected with the sprocket-wheels, clamps secured at intervals to the endless chains, and means to reciprocate the bed which supports the shuttle; whereby a series of reserve shuttles may be supported at the side of the loom and slid forward and backward, as described.

6. In a loom, the combination with one of the side frames of a loom, of a shuttle-carrier consisting of horizontal ways forming the supports for the bed of the shuttle-carrier, a bed having capacity to slide on its supports, shafts journaled in bearings carried on the bed, sprocket-wheels on the shafts, gears for operating the shafts, an actuating-pawl pivotally connected with a fixed part of the loom and engaging with one of the gears, and chains mounted on the sprocket-wheels and forming the supports for the reserve shuttles; whereby the shuttles are advanced by the reciprocation of the bed, as described.

7. In a loom, the combination with the lay, shuttle-boxes on the lay, openings in the fronts of the shuttle-boxes, gates forming, in their normal position, the bottoms of the shuttle-boxes, and mechanism operated by the cam-shaft for operating the gates, of a carrier for supporting a series of reserve shuttles, ways forming the support of the carrier on which the carrier may slide, endless chains mounted on sprocket-wheels, spring-clamps on the chains for supporting the reserve shuttles, means comprising a pawl pivotally connected with a fixed part of the loom for advancing the reserve shuttles, and mechanism controlled by the weft-fork for unlocking the gates, and actuating the shuttle-carrier; whereby on the exhaustion, or breaking, of the weft the gates and the shuttle-carrier are operated to supply a fresh shuttle to one shuttle-box while the faulty shuttle is ejected from the other shuttle-box, as described.

8. In a loom, the combination with the weft-hammer, the weft-fork and the weft-fork slide, of a bell-crank lever pivotally supported on the weft-fork slide, a weighted arm pivotally secured to the side of the weft-fork slide, said weighted arm having a cam-shaped lower surface resting on one arm of the bell-crank lever, an extension from the weighted arm for controlling the weft-fork, and stops controlling the bell-crank lever, whereby the effective operation of the weft-fork is suspended during one oscillation of the weft-hammer while the shuttle-changing mechanism is operated, as described.

9. In a loom, the combination with the weft-fork, the weft-fork slide and the weft-hammer, of the upwardly-extending horn $k^4$ on the weft-hammer, a bell-crank lever pivoted on the weft-fork slide, a lever pivotally supported on one side of the weft-fork slide, the weighted arm of the lever being supported on the beveled end of one arm of the bell-crank lever, and the stops $k^8$ and $k^9$; whereby, when the weft-fork detects the absence of the filling, the weft-hammer operates the weft-fork slide to control the shuttle-changing mechanism and raises the hook on the weft-fork above the path of the weft-hammer, while at the next oscillation of the weft-fork the projecting horn acts to replace the weft-fork in its operative position, as described.

10. In a loom, in combination with the carrier supporting the reserve shuttles and the shuttle, of a shuttle-clamp consisting of a fixed arm adapted to bear against one side of the shuttle and an arm secured to a spring-pressed rod bearing on the other side of the shuttle, as described.

11. In a loom, in combination with a shuttle, of the concavo-convex edge $h^{17}$ on the shuttle, a plate having on one side the fixed arm $h^{16}$ the inner face of which has a concavo-convex face corresponding with the lower part of one side of the shuttle, the rod $h^{19}$ supported in sliding bearings on the frame, the spiral spring surrounding and bearing on the rod $h^{19}$, and the arm $h^{18}$ secured to the rod $h^{19}$ and adapted to bear on the opposite side of the shuttle; whereby the shuttle is held on the carrier and may be readily lifted from the spring-clamp, as described.

In witness whereof I have hereunto set my hand.

WINFIELD S. THOMAS.

Witnesses:
J. A. MILLER, Jr.,
B. M. SIMMS.